(12) United States Patent
Marenco et al.

(10) Patent No.: US 9,328,010 B2
(45) Date of Patent: May 3, 2016

(54) METHOD FOR STRUCTURING A FLAT SUBSTRATE COMPOSED OF GLASS-TYPE MATERIAL, AND OPTICAL COMPONENT

(75) Inventors: Norman Marenco, Bokelrehm (DE); Hans-Joachim Quenzer, Itzehoe (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 277 days.

(21) Appl. No.: 14/238,564

(22) PCT Filed: Aug. 2, 2012

(86) PCT No.: PCT/EP2012/003332
§ 371 (c)(1),
(2), (4) Date: Apr. 17, 2014

(87) PCT Pub. No.: WO2013/023750
PCT Pub. Date: Feb. 21, 2013

(65) Prior Publication Data
US 2014/0301697 A1    Oct. 9, 2014

(30) Foreign Application Priority Data
Aug. 12, 2011 (DE) .......................... 10 2011 110 166

(51) Int. Cl.
| | |
|---|---|
| *G02B 6/26* | (2006.01) |
| *G02B 6/42* | (2006.01) |
| *C03B 23/02* | (2006.01) |
| *G02B 6/43* | (2006.01) |
| *C03B 40/02* | (2006.01) |

(52) U.S. Cl.
CPC .............. *C03B 23/02* (2013.01); *G02B 6/4206* (2013.01); *G02B 6/43* (2013.01); *C03B 40/02* (2013.01); *G02B 6/4214* (2013.01)

(58) Field of Classification Search
CPC  C03B 23/02; C03B 23/0026; C03B 23/0235; C03B 23/025; C03B 23/0252; C03B 23/035
See application file for complete search history.

(56) References Cited

U.S. PATENT DOCUMENTS

| | | |
|---|---|---|
| 6,951,119 B1 | 10/2005 | Quenzer et al. |
| 7,716,950 B2 | 5/2010 | Quenzer et al. |
| 2005/0067688 A1 | 3/2005 | Humpston |
| 2006/0096321 A1 | 5/2006 | Quenzer et al. |
| 2009/0288449 A1 | 11/2009 | Quenzer et al. |

FOREIGN PATENT DOCUMENTS

| | | |
|---|---|---|
| DE | 199 56 654 A1 | 6/2001 |
| DE | 103 13 889 B3 | 8/2004 |
| DE | 10 2005 063 276 A1 | 7/2007 |
| EP | 1 572 594 B1 | 12/2003 |
| EP | 1 606 223 B1 | 12/2005 |

*Primary Examiner* — Uyen Chau N Le
*Assistant Examiner* — Chad Smith
(74) *Attorney, Agent, or Firm* — Fitch, Even, Tabin & Flannery LLP

(57) ABSTRACT

The invention is a method for structuring a flat substrate composed of glass material in the course of a viscous flow process. The glass flat substrate is joined to a surface of a flat substrate, which is preferably a semiconductor flat substrate, having at least one depression bounded by a circumferential edge located in the surface. In the course of a subsequent tempering process, glass material is changed to a viscous free-flowing state in which at least proportions of the free-flowing glass material of the flat substrate flow over the circumferential edge into the depression in the flat substrate. The invention is also characterized in that a flat substrate is provided of which the at least one depression has at least one wetting surface that is countersunk with respect to the surface of the flat substrate and is at least partly bounded by a line-type edge which, at the same time, is an edge of a trench structure provided within the depression and countersunk with respect to the wetting surface and/or is determined by a discontinuous change in a wetting property for the free-flowing glass material that can be assigned to the wetting surface.

35 Claims, 4 Drawing Sheets

METHOD FOR STRUCTURING A FLAT SUBSTRATE COMPOSED OF GLASS-TYPE MATERIAL, AND OPTICAL COMPONENT

CROSS REFERENCE TO RELATED APPLICATION

Reference is made to German Application Serial No. DE 10 2011 110 166.0, filed Aug. 12, 2011, which application is incorporated herein by reference in its entirety.

BACKGROUND OF THE INVENTION

1. Field of the Invention

The invention relates to a method for structuring a flat substrate composed of glass material in the course of a viscous flow process, in which the glass flat substrate is joined to a surface of a flat substrate, preferably a semiconductor flat substrate, which has at least one depression bounded by a circumferential edge located in the surface and, in the course of a subsequent tempering process, is changed to a viscous free-flowing state in which at least proportions of the free-flowing glass material of the flat substrate flow over the circumferential edge into the depression in the flat substrate and furthermore to an optical component is described that can be manufactured with a method described above.

2. State of the Art

Manufacturing processes for manufacturing optical components which use silicon technology or wafer manufacturing make it possible to design miniaturized embodiments of optical or micro-opto-electro-mechanical systems (MOEMS), with the latter providing optical components as constituent elements of a housing component in so-called wafer level packages (WLPs). Such methods furthermore have great potential to save costs, because hundreds to thousands of components can be processed in parallel on a wafer. Moreover, in the joining of the optical components with micromechanical fastening structures supporting the aforesaid, there is no need to provide any joining tools or adjustment aids, in particular since the manufacturing processes inherently comprise mechanically very precise joining mechanisms.

Such a manufacturing method is, for example, described in EP 1 606 223 B1, which is based on the manufacture of optical surfaces based on the viscous flow of glass. To this effect a first wafer comprising a first glass type is connected to a second wafer comprising silicon or a second, higher-melting, glass type, e.g. by anodic bonding or direct bonding (fusion bonding). At its two planar surfaces the second wafer comprises depressions that provide a three-dimensional surface profile that as a result of the depressions includes structured cavities that are open on one side. While the planar surface regions after bonding are firmly connected to the first wafer, the cavities allow free flowing of the glass material of the first wafer as soon as said wafer in a tempering process at e.g. 700-800° C. has reached adequately low viscosity. During the free flowing of the glass into the cavities of the structured second wafer the forming of the surface of the first wafer is decisively determined by the surface tension of the glass. Thus, depending on the difference in the pressure between the deeply structured cavities and the atmosphere in the glass oven, concave or convex structures form on the surface of the first wafer, which surface faces the cavities.

Furthermore, the glass flow process is influenced by further factors, for example by the geometric design of the flowing front of the viscous glass material flowing into the cavities, and by the gas volume displaced by the material transport of the glass. The flow process stops as soon as equalization between the interior pressure and the ambient pressure has been reached, when the cavity is completely full, provided it has previously been evacuated, or when the viscosity of the glass material is no longer sufficient to support flowing. In the processing of glass the latter is the case, as a rule, if the process temperature drops to below a critical temperature value.

Apart from the use of glass, transparent polymers can also be used for producing optical components in the course of the above-described viscous flow process. If suitable polymers are selected, the viscosity can, for example, also be reduced in a controlled way by photo-induced chemical curing in order to in this manner achieve a flow stop.

In the hitherto known variations of the viscous flow process a two-dimensional structural plane is used for determining the basic shape of the optical component that is forming, while the height profile of the optical component results from process control. For example, optical lenses with a spherical profile can easily be manufactured in this way because the spherical shape results from a circular basic shape and a surface that is in force equilibrium. By including dynamic flow movements it is also possible to overlay so-called aspherical corrections, that in conical or hyperbolic components of the spherical basic shape.

The viscous flow process is particularly advantageous in the production of optical components with freely formable optical surfaces or of particularly smooth free-form surfaces that are used for impression forming, for example by means of embossing techniques, because no mechanical polishing or post-processing of the surfaces is required. Correspondingly, an already known use of the method relates to the production of a replication shape from a higher melting glass that, as described above, can be used as a second wafer for forming the first wafer. However, in order to form a three-dimensional structure, in free viscous flowing it is only the physical effects of surface wetting and surface tension that are available to a user.

EP 1 572 594 B1 discloses a method for post-processing optical lenses as described above, in which method elliptical areas of increased steepness in the transition region between the lens and the glass flat substrate can be removed by a thermal post-processing step supported by a moulding tool.

In contrast to this, the production of planar surfaces that are largely inclined in any desired manner and that can be used as mirrors or as optical prisms is problematic. Likewise, the production of surfaces that are inclined along any desired contour, that is surfaces in the form of an equiangular or oblique-angled coplanar pyramid segment, is not possible with the hitherto-known viscous flow process.

In reality, known manufacturing processes for creating projecting structures are based on replication processes such as moulding of lenses. In these glass impression techniques, due to the high operating temperatures involved, only those materials can be considered for mould construction that are capable of withstanding the high temperatures and pressures experienced. Nevertheless, such methods only allow the replication of small work pieces, but not of entire wafers. In the field of wafer technology, as a subtractive process diamond grinding with high-precision numerically controlled machines is used in order to create microstructured surfaces of almost optical quality. Ultrasonic processing and laser direct structuring are further alternatives in this context. By means of chemical post-processing, the surfaces can be smoothed to usually achieve adequate optical quality. Furthermore, chemical etching techniques exist that allow structuring of height profiles. Additive processes such as vapor deposition are rather rarely worth considering in the context of height profiles of several micrometers.

SUMMARY OF THE INVENTION

The invention is an improved method for structuring a flat substrate composed of glass material in the course of a viscous flow process, in which the glass flat substrate is joined to a surface of a flat substrate which has at least one depression bounded by a circumferential edge located in the surface and, in the course of a subsequent tempering process, is changed to a viscous free-flowing state in which at least proportions of the free-flowing glass material of the flat substrate flow over the circumferential edge into the depression in the flat substrate, in such a manner that planar surfaces that are largely inclined in any desired manner can be permanently formed from the glass material. Furthermore, it should be possible, if required, to give these planar surfaces a positive or negative curvature. By use of the method according to the invention it should, moreover, be possible to produce optical components that have a high degree of optical integrability.

According to the invention, a method for structuring a flat substrate composed of glass material in the course of a viscous flow process according to the invention providing a flat substrate in which at least one depression has at least one wetting surface that is countersunk with respect to the surface of the flat substrate and is at least partly bounded by a line-type edge which, at the same time, is an edge of a trench structure provided within the depression and countersunk with respect to the wetting surface and/or is determined by a discontinuous change in a wetting property for the free-flowing glass material that can be assigned to the wetting surface. During the tempering process, the free-flowing glass material is brought into contact with the wetting surface in such a way that a three-dimensionally stable wetting front forms along the line-type edge, wherein the tempering process is ended with the formation of a surface of the glass material that extends between the wetting front and the circumferential edge without contact with the flat substrate and encloses a cavity with a sub-region of the depression.

Furthermore, a semiconductor flat substrate, for example silicon, is used as a flat substrate, in particular since on the one hand semiconductor materials provide higher melting temperatures than glass (which is a significant requirement of the flat substrate used), and since on the other hand semiconductor materials make it possible to use structuring methods known in semiconductor technology. Other materials, which are higher-melting than glass, can be used, for example ceramics or other selected metals or metal alloys.

The invention provides for controlled contacting of the viscous free-flowing glass material with a wetting surface which is situated within a depression of the surface-structured semiconductor flat substrate. The wetting surface is countersunk with respect to the surface of the semiconductor substrate and in lateral surface extension is bounded by a line-type geometric and/or virtual surface edge that at the same time is used as a flow boundary of the viscous free-flowing glass mass.

During the flow process the softened viscous free-flowing glass material of the flat substrate spreads over the circumferential edge that bounds the depression on the surface of the semiconductor flat substrate into the depression and establishes contact with the wetting surface provided in that location, wherein between the contact region of the glass material and the lateral walls of the semiconductor substrate, which walls form the boundary of the depression, a surface of the glass material forms that extends without contact on the one hand from the circumferential edge of the depression on the surface of the semiconductor substrate, and on the other hand is bounded by a wetting front that forms on the wetting surface.

When the wetting front, which in the course of the further flow process spreads in the direction of the wetting surface edge of the viscous free-flowing glass that is in contact with the wetting surface, reaches the wetting edge, it is prevented from any further lateral spreading in the plane of the wetting surface. Thus by the geometric design of the line-type wetting surface edge it is possible to determine the shape and size of the surface of the glass material, which forms without contact with the semiconductor substrate between the circumferential edge and the wetting edge. For example, if at least sections of the circumferential edge and of the wetting surface edge are designed in a straight line, wherein both edge regions extend parallel to each other, a flat or planar surface or a surface that comprises an inclined plane forms between the two edge regions.

The line-type edge on the wetting surface, which edge is used as a wetting stop, can basically be implemented in the following two ways:

a) A local or selective mechanical and/or chemical surface treatment of the bottom of the depression can alter the wetting properties of the viscous free-flowing glass in such a way that the wetting front of the free-flowing glass spreads faster on the surface-treated bottom region than in other bottom regions that have not been subjected to surface treatment. The wetting surface produced in this way thus represents that surface region of the bottom of the depression, which surface region has undergone surface treatment; it is bounded at its surface-treated circumferential edge from the non-treated bottom region only by a virtual edge line on which a discontinuous transition in the wetting properties can be observed. Particularly suitable surface treatments involve, for example, the deposition of an $SiO_2$ layer on an Si flat substrate.

b) The other option for producing a wetting surface encompassed by a line-type edge is the provision of a trench structure which encompasses the wetting surface at least in some regions but preferably over the entire circumference in order to in this manner by a geometric shape is created having a line edge on which lateral spreading of the wetting front of the viscous free-flowing glass material is stopped. Of course, it is possible to combine the two measures a) and b) to form a line-type lateral boundary of a wetting surface.

In order to prevent any uncontrolled overflow of the viscous glass material over the line-type edge of the wetting surface, when the wetting front has reached the line-type edge of the wetting surface the flow process is ended by lowering the process temperature, and consequently the viscosity is increased and the free-flowing nature is impeded.

Furthermore, the spreading characteristics of the wetting front along the wetting surface can be influenced by a change in the pressure conditions within the oven chamber or process chamber in which the tempering process is carried out. In a preferred method, prior to carrying out the tempering step, the glass flat substrate is joined in a gas-proof manner to the surface of the semiconductor flat substrate, which surface comprises depressions, by means of anodic bonding or direct bonding (fusion bonding). The joining process preferably takes place in the presence of a gas atmosphere at a predetermined process pressure or ambient pressure which after closing the depression made in the semiconductor substrate is preserved in a gas-proof manner with the glass flat substrate within the cavity that forms in this process.

During the tempering process, which takes place in a tempering oven, the viscous glass material flows into the cavity and in this process reduces the gas volume present in the cavity, wherein the reducing gas volume within the cavity is bounded on the one hand by regions of the cavity wall and on the other hand by the free surface of the glass material, which free surface forms between the wetting front on the wetting surface and the circumferential edge situated on the surface of the semiconductor substrate.

By increasing or decreasing the process pressure in the tempering oven, the dynamic advance of the wetting front along the wetting surface can be influenced. Thus in this way it is possible, for example, to completely stop any lateral advance of the wetting front along the wetting surface, provided the process pressure within the oven chamber is set in such a way that the pressure of the gas enclosed within the cavity prevents the further lateral spread of the wetting front.

The method according to the invention makes it possible for the first time to produce planar non-contacting glass surfaces at an incline to the wafer surface, which incline can be set within a wide range, for example with inclination angles of between 10° and 80°. Such planar non-contacting surfaces form between two straight-line edge contours that are aligned parallel to each other, wherein one edge contour represents the wetting front of the viscous free-flowing material, which wetting front is predetermined on the wetting surface by its edge contour, and the other edge contour is the circumferential edge on the semiconductor substrate surface.

Advantageously, in the manufacture of glass surfaces it makes sense to interrupt the tempering process and to establish open access to the cavity. For example, to this effect on the rear of the semiconductor substrate a through-channel to the cavity, which at the front is enclosed by the glass flat substrate, is created in the course of an etching process or drilling process. In a subsequent continuation of the tempering process, as a result of the through-channel, the process pressure present within the cavity is the same as that within the tempering oven. Consequently, a planar surface is automatically formed that has minimum surface tension when compared to curved surface geometries.

Moreover, it is possible to again interrupt the tempering process in order to, for example, close off the through-channel and to subsequently continue anew.

If, furthermore, the process pressure during the tempering process is altered in a controlled manner, in this way, moreover, shaping the surface of the glass material, which surface extends without contact with the semiconductor substrate between the wetting front and the circumferential edge, can be influenced. If starting from the state of a surface of the glass material, which surface extends in a planar way between the wetting front and the circumferential edge, the process pressure within the tempering oven is reduced, the resulting non-contacting surface of the glass material assumes a concave shape. Conversely, if the process pressure is increased in a controlled manner, a convex, free, that is non-contacting, surface of the glass material forms.

Furthermore, the geometric shape of the surface of the glass material, which surface extends without contact, can be influenced in that the edge contours of both the lower wetting front and the upper circumferential edge are geometrically designed other than in a straight-line parallel shape, for example in a parabolic or circular shape. In this manner correspondingly differently-shaped surface forms can be produced. The variation options are almost limitless in terms of the geometric design of the wetting front as well as the circumferential edge. These options are guided exclusively by the desired optical target surfaces that are to be produced.

After completion of the tempering process, subsequent processing of the semiconductor glass-substrate composite surface depends on the intended technical purpose of the surface of the glass material that has been produced according to the invention without contact. As the following description will show with reference to the following exemplary embodiments, in a preferred embodiment the surface of the glass flat substrate, which surface has been produced without contact, serves as a replication mould. For this purpose it is necessary, after completion of the tempering process, to separate the glass flat substrate from the semiconductor flat substrate so that its form is preserved. The separation process can, for example, take place by etching techniques that are known per se, or with the use of a sacrificial layer that is to be put in place between the two substrate surfaces prior to the flat substrate composed of glass material being brought into contact with the semiconductor flat substrate.

In a further application, the surface of the glass material, which surface has been manufactured without contact according to the invention, is used as an optical surface for guiding light within an optical element. To this effect it is necessary to split at least sub-regions between the glass flat substrate and the semiconductor flat substrate. A preferred embodiment of an optical element designed in this way provides for a flat substrate that is completely separated from the semiconductor substrate and that comprises glass material, which flat substrate on one face is structured according to the invention and on the opposite face is of a planar design. Indirectly or directly on the planar surface of the flat substrate composed of glass material, a light source is arranged that, by way of the planar surface, couples light into the structured flat substrate composed of glass material in such a way that the light on the light-deflective optically effective surface within the flat substrate composed of glass material is deflectable.

The optical component according to the invention comprising at least one optically effective surface that forms part of a structured flat substrate composed of glass material, with an optical axis being assignable to said effective surface, includes the optical axis encompassing an angle α with a flat substrate plane that is assignable to the flat substrate, which angle α is other than 0° or 90°. The optically effective surface has a surface smoothness that corresponds to a surface smoothness of a surface of glass material that has been made without contact.

Such an optical component can, in particular, be made with the method according to the invention and features, in particular, a high degree of integrability at the wafer plane. Thus in this way optics for lasers or photodiodes for coupling to optical fibres, for example in optical chips, printed circuit boards, glass fibres etc. can be realized.

BRIEF DESCRIPTION OF THE DRAWINGS

Below, the invention is described as an example, without limiting the general scope and nature of the invention, with reference to exemplary embodiments and the drawings. The following are shown.

DESCRIPTION OF THE PREFERRED EMBODIMENTS

The sequential images according to FIGS. 1a to f in each case show a cross-sectional view of a flat substrate 1 composed of glass material, which flat substrate 1 has been joined to a semiconductor flat substrate 2.

Figure 1A:
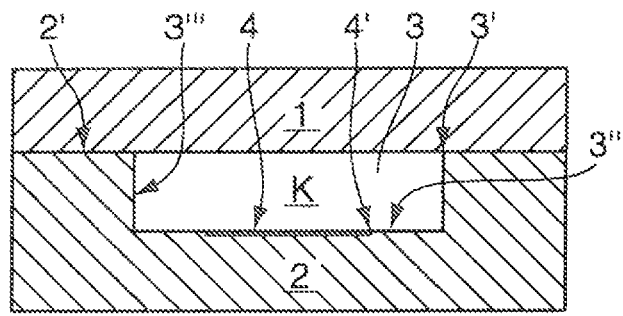
FIGS. 1*a* to *f* illustrate sequential images for explaining the method according to the invention for the non-contacting manufacture of a surface of a glass material.

FIG. 1a shows a cross section or partial cross section of a semiconductor flat substrate 2 designed as a silicon wafer whose surface 2' has a depression 3 bounded by a circumferential edge 3' located in the surface 2'. The depression 3 was preferably incorporated in the semiconductor flat substrate 2 in the course of a chemical etching process. It is assumed that the depression 3, as shown in the exemplary embodiment shown, is encompassed by a planar depression bottom 3" and a sidewall 3''' encompassing the depression bottom 3".

Furthermore, on the otherwise planar depression bottom 3" a surface-treated region 4 is provided which furthermore serves as a wetting surface so that during wetting with a free-flowing glass material a dynamically spreading wetting front forms that spreads faster along the wetting surface 4 than on the non-surface-treated or non-surface-modified surface region of the depression bottom 3". A suitable surface modification provides, for example, for an $SiO_2$ layer on an Si flat substrate.

The wetting surface 4 is bounded by a line-type edge 4' on which a discontinuous change in a wetting property for the free-flowing glass material that can be assigned to the wetting surface 4 occurs in the sense as described above.

On the surface 2' of the semiconductor flat substrate 2 the flat substrate 1 composed of glass is joined in a gas-proof manner, preferably in the course of anodic bonding or fusion bonding, and in this manner closes off the depression 3 in a hermetically gas-proof way so that the depression 3 with the flat substrate 1 represents a hermetically closed-off cavity K.

Figure 1B:
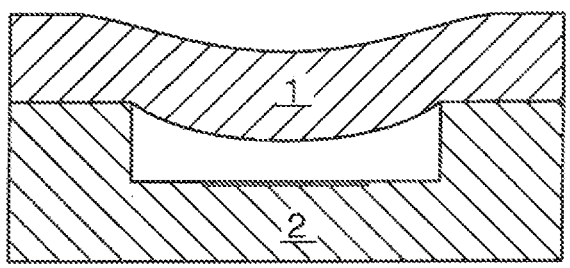

In the method-related step according to FIG. 1b the wafer composite described above is heated in a tempering oven (not shown) so that the glass or the glass material of the flat substrate 1 enters the region of the cavity K as a result of viscous flowing. The viscous free-flowing glass material establishes contact with the wetting surface 4 while forming a wetting front that laterally spreads along the wetting surface 4. The wetting front spreads as a result of the continuous free flow of glass material along the wetting surface 4 until it reaches the edge 4' of the surface-modified wetting surface 4 at which the wetting front is stopped. At around this time the process temperature within the tempering oven is reduced, and consequently the free-flowing nature of the glass material of the flat substrate 1 is also reduced. This is illustrated in the sequential image according to FIG. 1c in which the surfaces 5, forming without contact, of the glass material of the flat substrate 1 are also shown. The free surfaces 5 are spaced apart both from the depression bottom 3" and the depression walls 3''' and form without contact as overhanging surface regions on the one hand between the circumferential edge 4' of the wetting surface 4 and on the other hand the circumferential edge 3' of the depression 3.

Figure 1C:
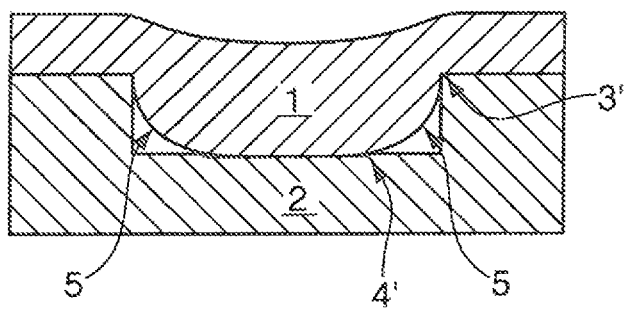
Figure 1D:
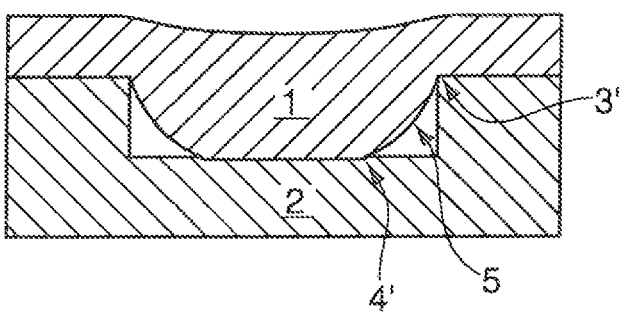
Figure 1E:
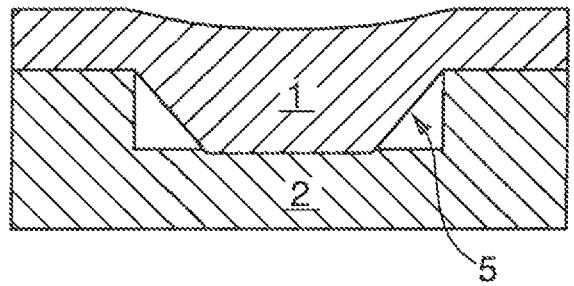

FIG. 1d shows that by reducing the pressure conditions within the tempering oven a return flow of the viscous glass material can be caused, as a result of which the curvature of the free surfaces 5 can be varied in the sense of reduced (see in comparison with FIG. 1c). Depending on process control, using thermal post-processing and suitable setting of the pressure conditions within the tempering oven, a particular surface curvature on the surfaces 5 can be set. For example, a targeted convex shape according to FIG. 1d, a planar surface shape according to FIG. 1e, and a concave surface shape according to FIG. 1f can be produced.

When a particular desired shape of the surface 5 has been achieved, the composite comprising the semiconductor flat substrate 2 and the glass flat substrate 1 needs to be removed as quickly as possible from the tempering oven and needs to be placed into an environment with a lower ambient temperature so that cooling of the softened glass material takes place quickly in order to in this manner spatially "freeze" the surface geometry. Normally it is adequate for the substrate composite from the tempering oven in which process temperatures are approximately 800° C. to be placed into a cooling region at temperatures of approximately 500° C.

The size and shape of the spreading non-contacting surface 5 can be influenced on the one hand by the edge geometry 4' of the wetting surface 4 and the edge geometry of the circumferential edge 3'. Furthermore, the lateral space between both edge lines 4' and 3' also plays a role in terms of the span of the surface 5 that forms without contact.

For precisely-reproducible implementability of the method according to the invention a wetting stop, which can geometrically be precisely determined, along the wetting surface 4 at its bounding edge 4' is of decisive importance.

Figure 1F:
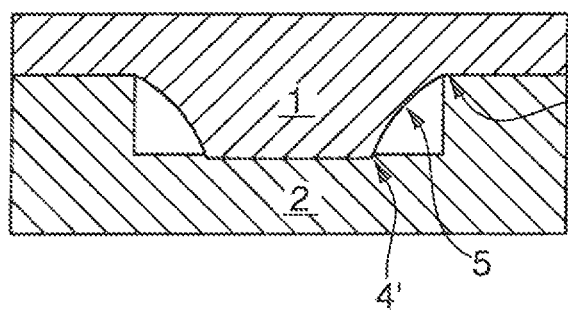
Figure 1G:
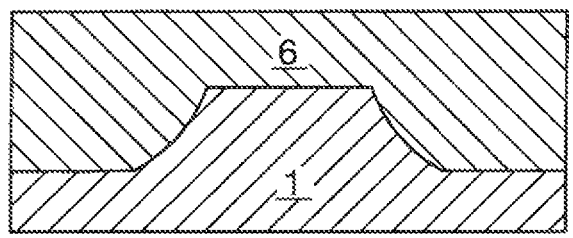
FIG. 1*g* illustrates a method-related step for replicating a surface structure.

Starting from the process state according to FIG. 1f, in which state the glass flat substrate 1 comprises slightly convex-shaped surface regions 5, in a further process step (not shown) in the course of an etching process the semiconductor flat substrate 2 is removed from the flat substrate 1. In the further process the flat substrate 1 that is structured on one side and that is now present in an isolated manner is used as a replication shape for a subsequent impression process whose result is illustrated in FIG. 1g. It is assumed that onto the flat substrate 1 according to FIG. 1f a further glass wafer 6 from a glass that melts at low temperature has been bonded under vacuum conditions onto the structured top of the flat substrate 1. In the course of a subsequent tempering process the glass wafer 6 conforms true to contours to the surface shape of the flat substrate 1, as is shown in FIG. 1g. In the implementation of the tempering process a process temperature is selected in which the flat substrate 1, which serves as the replication shape, remains dimensionally stable so that the replication shape can be used multiple times. In order to separate the flat substrate 1, which serves as the replication shape, from the surface-structured glass wafer 6, a layer comprising, for example, silicon or germanium, which layer has previously been applied to the surface-structured flat substrate, is used, which layer can finally be etched out, without in this process damaging the surface structures either of the glass wafer 6 or of the flat substrate 1.

Figure 1H:
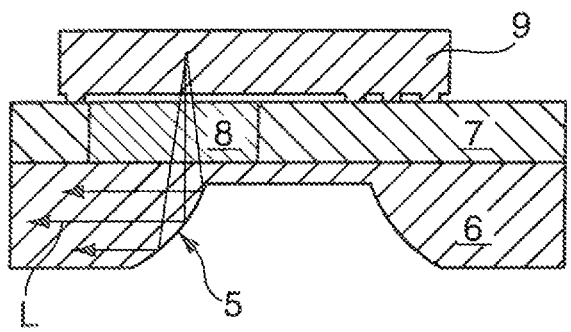
FIG. 1*h* illustrates the use of a formed glass substrate within an optical component.

FIG. 1h shows a cross-sectional view of an optical component that uses the above-described surface-structured glass wafer 6. The glass wafer 6 with the height profile produced according to the invention is bonded at its flat surface to a silicon wafer 7. By means of a suitably selected etching technique an optically transparent window 8 has been incorporated in the silicon wafer 7. In this arrangement the optically transparent window 8 is situated above the surface shape 5 that results from the impression, true-to contour, of the surface 5, produced according to the invention, of the flat substrate 1.

The glass wafer 6 shown in FIG. 1h is mirrored, either locally at the surface 5 or overall at the structured surface. Furthermore, on the surface of the silicon wafer 7 a light emitter 9 has been arranged, for example a vertically-emitting laser diode, which has been placed in such a way relative to the optically transparent window 8 that the light beam L emanating from the light emitter 9 impinges on the slightly concave mirrored surface 5. At this surface 5, lateral deflection of the light beam L takes place as does at the same time focusing or collimation in one axis or in two axes.

In the sequential images according to FIGS. 2a to 2g a second method variant according to the invention for the manufacture without contact of an optical surface 5 of a glass material is illustrated.

Figure 2A:
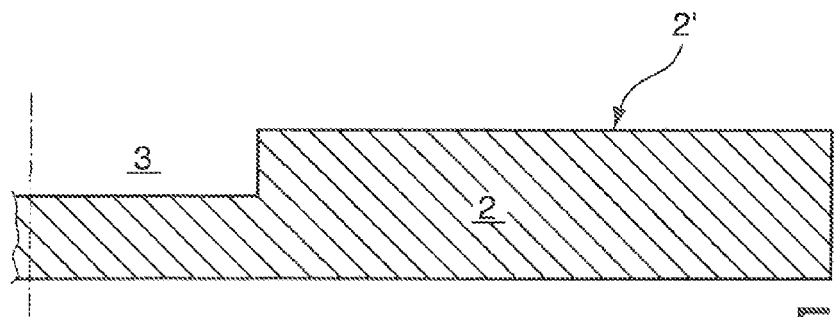
FIGS. 2*a* to *g* illustrate sequential images for illustrating an alternative surface made in a non-contacting manner from glass material.
Figure 2B:
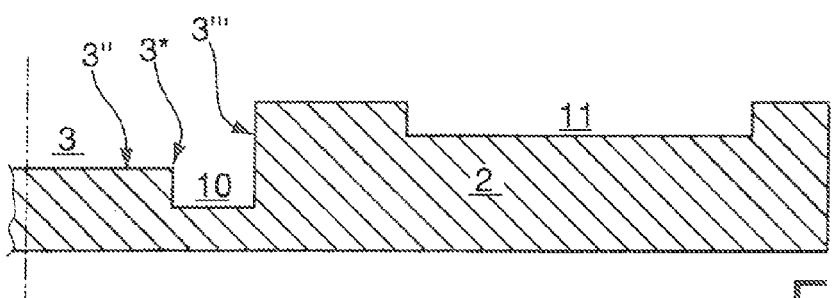

FIG. 2a is a cross-sectional view of a semiconductor flat substrate 2, preferably in the form of a silicon wafer which with suitable etching technology at its surface 2' provides for a depression 3. Furthermore, it is assumed that the semiconductor flat substrate 2 and the depression 3 continue in a suitable manner, preferably mirror-symmetrically, to the left of the dot-dash line. In a second etching step, in the region of the depression 3, a trench structure 10 is made, which peripherally encompasses the depression floor 3" at least in some regions. In the exemplary embodiment shown in FIG. 2b, the trench structure 10 connects so as to be flush with the depression wall 3'''. As a result of the provision of a trench structure 10 directly adjacent to the depression bottom 3", the depression bottom 3" is provided with an edge line 3* that circumferentially bounds the depression bottom 3". The edge line 3* furthermore acts as a wetting front stop to the spread of a viscous free-flowing glass mass. Optionally, in the context of the second etching step, further depressions 11 could be made in the surface of the semiconductor flat substrate 2 which are however without particular significance in the context of the method according to the invention.

Figure 2C:
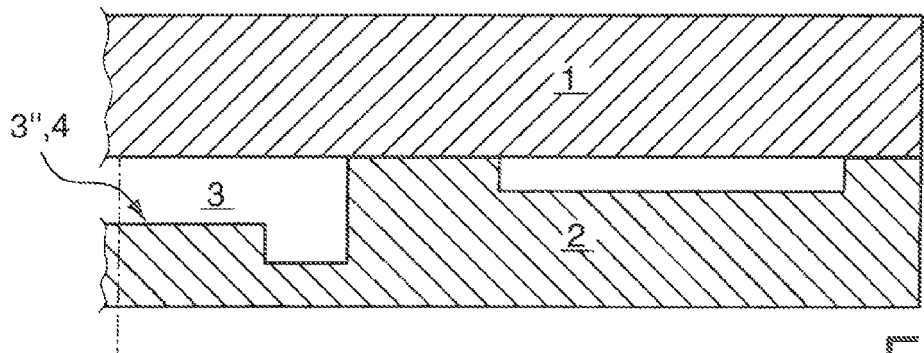
Figure 2D:
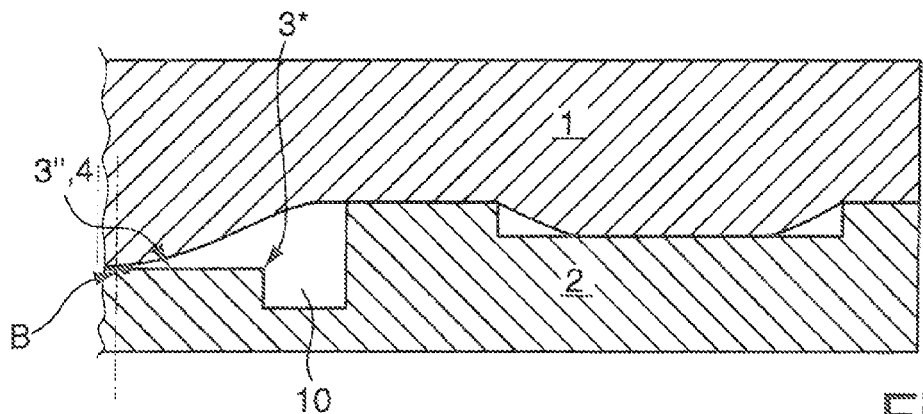
Figure 2E:
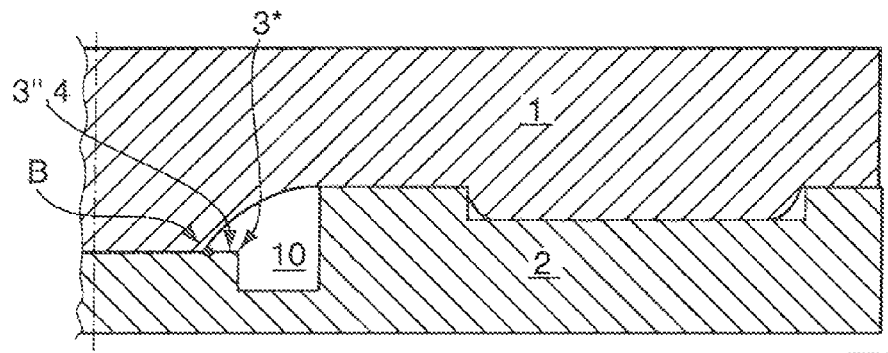
Figure 2F:
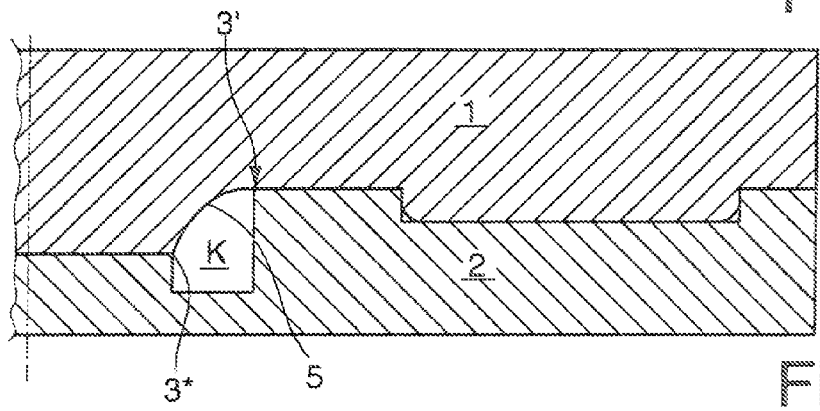

FIG. 2c shows the process-related step in which a flat substrate 1 composed of glass material is bonded to the surface of the semiconductor flat substrate 2. In this process the flat substrate 1 again encloses a cavity K in a gas-proof manner in the region of the depression 3. By increasing the process temperature within a tempering oven, into which the two bonded flat substrates 1 and 2 are placed, viscous flowing of the glass material into the depressions 3, 11 takes place causing the glass mass of the flat substrate 1 to start to wet the depression floor 3", which serves as a wetting surface 4 (in this context see FIG. 2d). By lowering the glass mass to the depression floor 3" lateral advancement of the wetting front B takes place in the direction of the edge line 3* of the depression bottom 3", which edge line 3* has been predetermined by the trench structure 10 (see FIG. 2e). When the wetting front B has reached the location of the edge line 3*, lateral wetting of the depression bottom 3", which serves as a wetting surface, stops without the trench structure 10 being filled. When this wetting state according to FIG. 2f has been reached, the process temperature within the tempering oven is reduced so that filling the trench structure 10 is reliably prevented. In this way a free surface 5 of the glass material forms, which surface 5 extends without contact from the lower edge, that is from the edge line 3* of the depression floor 3", to the upper circumferential edge 3' of the depression 3. Depending on the pressure conditions between the operating pressure within the tempering oven and the pressure enclosed in the cavity K, a convex or a concave or a straight-line surface if formed. By altering the pressure conditions between the operating pressure of the tempering oven and the cavity K, and in a supplementary manner by altering the process temperature within the tempering oven, the shape of the meniscus, that is the curvature of the surface 5, can be altered in such a manner that the meniscus in the perpendicular direction is concave, convex or rectilinear in shape.

Figure 2G:
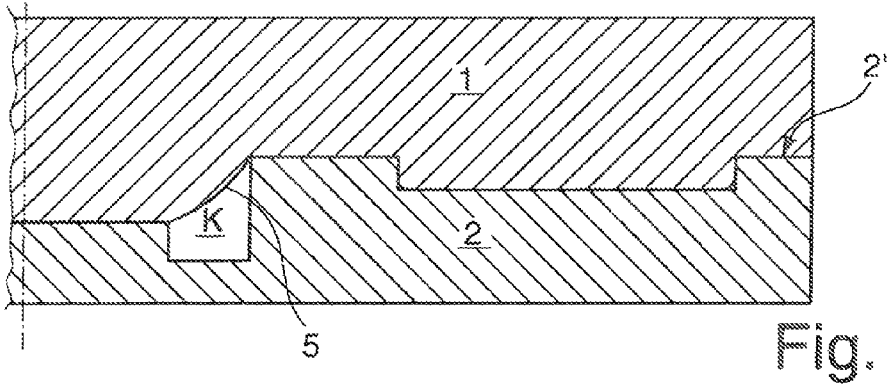
Figure 2H:
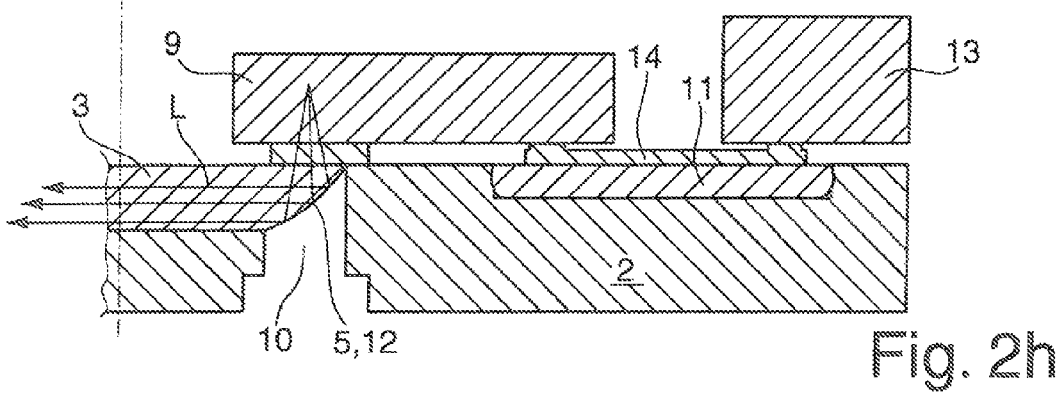
FIG. 2*h* illustrates a lateral view of an optical element.

Starting from the flat substrate combination shown in FIG. 2g, comprising a semiconductor flat substrate 2 structured on one side, and a flat substrate 1, composed of glass material, which flat substrate 1 has also been structured on one side in the course of a flow process carried out according to the invention, the optical element illustrated in FIG. 2h is manufactured. To this effect, first the flat substrate 1 composed of glass material is removed, flush to the surface 2' of the semiconductor flat substrate 2, so that only glass material remains within the depressions 3 and 11. Furthermore, in the region of the trench structure 10, the semiconductor flat substrate is opened downwards by an etching technique. In this manner lower access to the surface 5 manufactured without contact according to the invention is created so that the surface 5 on one side can be given a mirror layer 12. Thus the free glass surface 5 serves as a mirror element for focusing a ray beam L, coupled in vertically to the surface, of a laser diode 9 that has been applied as shown to the surface of the layer arrangement. In addition a driver chip 13 is provided which is used for high-frequency modulation of the light signal emitted from the laser diode 9. To this effect the driver chip 13 is connected to the laser diode 9 by way of an electrical line 14 that is dielectrically decoupled from the semiconductor flat substrate 2 by way of the glass of the flat substrate 1, which glass has been placed in the cavity 11.

LIST OF REFERENCE NUMERALS

1 Flat substrate
2 Semiconductor flat substrate
2' Surface of the semiconductor flat substrate
3 Depression
3' Circumferential edge of the depression
3" Depression bottom
3''' Depression wall
3* Edge line of the depression bottom
4 Surface-modified depression bottom, auxiliary surface or wetting surface
5 Contactless surface of the glass material
6 Glass wafer from a low-melting material as 1
7 Silicon wafer
8 Transparent window
9 Light emitter, laser diode
10 Trench structure
11 Second depression
12 Reflective layer
13 Driver chip
14 Connecting line
B Wetting front
K Cavity
L Laser beam

The invention claimed is:

1. A method for structuring a flat substrate comprising a glass material during a viscous flow process in which a glass flat substrate is joined to a surface of another flat substrate which has at least one depression bounded by a circumferential edge located in the surface and during a subsequent tempering process in which the glass material is changed to a viscous free-flowing state in which at least proportions of the free-flowing glass material of the glass flat substrate flows over the circumferential edge into the depression in the other flat substrate, comprising:

providing the other flat substrate so that in at least one depression at least one wetting surface is present that is countersunk with respect to the surface of the other flat substrate and is at least partly bounded by another edge which, at the same time, is an edge of a trench provided within the depression and countersunk with respect to the wetting surface;

carrying out the tempering process so that the free-flowing glass material of the glass flat substrate is brought into contact with the wetting surface so that a wetting front forms along the another edge; and ending the tempering process after the formation of a surface of the glass material, which extends between the wetting front and the circumferential edge without contact with the other flat substrate and that encloses a cavity within a sub-region of the depression.

2. The method according to claim 1, wherein:
joining of the glass flat substrate to the surface of the other flat substrate by an anodic bonding or a direct bonding.

3. The method according to claim 1, wherein:
the glass flat substrate closes off the at least one depression to form a closed cavity trapping gas and joining the glass flat substrate takes place in the presence of a gas atmosphere at a predeterminable process pressure so that directly after joining of the glass flat substrate within the cavity gas from the gas atmosphere is enclosed.

4. The method according to claim 3, wherein:
during tempering a controlled change in the process pressure is used to influence a shape of the surface of the glass material extending between the wetting front and the circumferential edge without contact with the other flat substrate.

5. The method according to claim 4, wherein:
during the controlled change of the process pressure of the surface of the glass material, a concave surface is produced by reducing the process pressure and a convex surface is produced by increasing the process pressure.

6. The method according to claim 3, wherein:
the tempering process is interrupted at least once, so that open access to the at least one cavity is created; and
thereafter the tempering process is continued.

7. The method according to claim 6, wherein:
the tempering process is interrupted at least once more while the at least one open access is closed, and
thereafter the tempering process is then continued.

8. The method according to claim 1, wherein:
after completion of the tempering process, the glass flat substrate is separated from the other flat substrate to obtain a structured surface of the glass flat substrate; and
the structured surface of the glass flat substrate is a replica mould.

9. The method according to claim 1, wherein:
after completion of the tempering process, the glass flat substrate is separated completely or in sub-regions from the other flat substrate and a structured surface of the glass flat substrate is obtained; and
at least the surface of the glass material, extending between the wetting front or originally between the wetting front and the circumferential edge without contact with the other flat substrate, is an optical surface of an optical element.

10. The method according to any claim 1, wherein:
the other flat substrate comprises a glass material having a melting temperature higher than a melting temperature of the glass flat substrate.

11. The method according to claim 1, wherein:
a semiconductor substrate or a ceramic substrate is the another flat substrate.

12. A method for structuring a flat substrate comprising a glass material during a viscous flow process in which the glass flat substrate is joined to a surface of another flat substrate which has at least one depression bounded by a circumferential edge located in the surface during a subsequent tempering process in which the glass material is changed to a viscous free-flowing state in which at least proportions of the free-flowing glass material of the glass flat substrate flows over the circumferential edge into the depression in the other flat substrate, comprising:

providing the other flat substrate so in at least one depression at least one wetting surface is present that is countersunk with respect to the surface of the other flat substrate and is at least partly bounded by another edge which is determined by a discontinuous change in a wetting property of the wetting surface for the free-flowing glass material wherein the wetting property of the wetting surface is selected so that surface modification occurs during wetting of the wetting surface with the free-flowing glass material having a dynamically spreading wetting front which spreads faster than on a surface which is not modified;

carrying out the tempering process so that the free-flowing glass material of the glass flat substrate contacts the wetting surface with a wetting front forming along the another edge; and ending the tempering process after the formation of a surface of the glass material, with the formed surface extending between the wetting front and the circumferential edge without contact with the other flat substrate which encloses a cavity within a sub-region of the depression.

13. The method according to claim 12, wherein:
joining of the glass flat substrate to the surface of the other flat substrate by an anodic bonding or a direct bonding.

14. The method according to claim 12, wherein:
the glass flat substrate closes off the at least one depression to form a closed cavity trapping gas and joining the glass flat substrate takes place in the presence of a gas atmosphere at a predeterminable process pressure so that directly after joining of the glass flat substrate within the cavity gas from the gas atmosphere is enclosed.

15. The method according to claim 14, wherein:
during tempering a controlled change in the process pressure is used to influence a shape of the surface of the glass material extending between the wetting front and the circumferential edge without contact with the other flat substrate.

16. The method according to claim 15, wherein:
during the controlled change of the process pressure of the surface of the glass material, a concave surface is produced by reducing the process pressure and a convex surface is produced by increasing the process pressure.

17. The method according to claim 14, wherein:
the tempering process is interrupted at least once, so that open access to the at least one cavity is created; and
thereafter the tempering process is continued.

18. The method according to claim 17, wherein:
the tempering process is interrupted at least once more while the at least one open access is closed, and
thereafter the tempering process is then continued.

19. The method according to claim 12, wherein:
after completion of the tempering process, the glass flat substrate is separated from the other flat substrate to obtain a structured surface of the glass flat substrate; and
the structured surface of the glass flat substrate is a replica mould.

20. The method according to claim 12, wherein:
after completion of the tempering process, the glass flat substrate is separated completely or in sub-regions from the other flat substrate and a structured surface of the glass flat substrate is obtained; and at least the surface of the glass material, extending between the wetting front or originally between the wetting front and the circumferential edge without contact with the other flat substrate, is an optical surface of an optical element.

21. The method according to claim 12, wherein:
a semiconductor substrate or a ceramic substrate is the another flat substrate.

22. The method according to any claim 12, wherein:
the other flat substrate comprises a glass material having a melting temperature higher than a melting temperature of the glass flat substrate.

23. A method for structuring a flat substrate comprising a glass material during a viscous flow process in which a glass flat substrate is joined to a surface of another flat substrate which has at least one depression bounded by a circumferential edge located in the surface and during a subsequent tempering process in which the glass material is changed to a viscous free-flowing state in which at least proportions of the free-flowing glass material of the glass flat substrate flows over the circumferential edge into the depression in the other flat substrate, comprising:
providing the other flat substrate so that in at least one depression at least one wetting surface is present that is countersunk with respect to the surface of the other flat substrate and is at least partly bounded by another edge which, at the same time, is an edge of a trench provided within the depression which is countersunk with respect to the wetting surface and is determined by a discontinuous change in a wetting property of the wetting surface of the free-flowing glass material, wherein the wetting property of the wetting surface is selected so that surface modification during wetting of the wetting surface with the free-flowing glass material is a dynamic spreading of a wetting front that spreads faster than on a surface which is not modified;
carrying out the tempering process so that the free-flowing glass material of the glass flat substrate is brought into contact with the wetting surface so that the wetting front forms along the another edge; and
ending the tempering process after the formation of a surface of the glass material which extends between the wetting front and the circumferential edge without contact with the other flat substrate and which encloses a cavity within a sub-region of the depression.

24. The method according to claim 23, wherein:
joining of the glass flat substrate to the surface of the other flat substrate by an anodic bonding or a direct bonding.

25. The method according to claim 23, wherein:
the glass flat substrate closes off the at least one depression to form a closed cavity trapping gas and joining the glass flat substrate takes place in the presence of a gas atmosphere at a predeterminable process pressure so that directly after joining of the glass flat substrate within the cavity gas from the gas atmosphere is enclosed.

26. The method according to claim 25, wherein:
during tempering a controlled change in the process pressure is used to influence a shape of the surface of the glass material extending between the wetting front and the circumferential edge without contact with the other flat substrate.

27. The method according to claim 26, wherein:
during the controlled change of the process pressure of the surface of the glass material, a concave surface is produced by reducing the process pressure and a convex surface is produced by increasing the process pressure.

28. The method according to claim 25, wherein:
the tempering process is interrupted at least once, so that open access to the at least one cavity is created; and
thereafter the tempering process is continued.

29. The method according to claim 28, wherein:
the tempering process is interrupted at least once more while the at least one open access is closed, and
thereafter the tempering process is then continued.

30. The method according to claim 23, wherein:
after completion of the tempering process, the glass flat substrate is separated from the other flat substrate to obtain a structured surface of the glass flat substrate; and
the structured surface of the glass flat substrate is a replica mould.

31. The method according to claim 23, wherein:
after completion of the tempering process, the glass flat substrate is separated completely or in sub-regions from the other flat substrate and a structured surface of the glass flat substrate is obtained; and
at least the surface of the glass material, extending between the wetting front or originally between the wetting front and the circumferential edge without contact with the other flat substrate, is an optical surface of an optical element.

32. The method according to any claim 23, wherein:
the other flat substrate comprises a glass material having a melting temperature higher than a melting temperature of the glass flat substrate.

33. The method according to claim 23, wherein:
a semiconductor substrate or a ceramic substrate is the another flat substrate.

34. An optical component comprising an optical surface having an optical axis and a structured flat substrate comprising glass material having an associated optical axis and a flat substrate plane surface which encompasses an angle α other than 0° or 90°, wherein the optical surface has a surface smoothness corresponding to a surface smoothness of a surface of glass material that has been made without contact, and is manufactured with a method comprising structuring a flat substrate comprising a glass material during a viscous flow process in which a glass flat substrate is joined to a surface of another flat substrate which has at least one depression bounded by a circumferential edge located in the surface and during a subsequent tempering process in which the glass material is changed to a viscous free-flowing state in which at least proportions of the free-flowing glass material of the glass flat substrate flows over the circumferential edge into the depression in the other flat substrate, comprising providing the other flat substrate so that in at least one depression at least one wetting surface is present that is countersunk with respect to the surface of the another flat substrate and is at least partly bounded by another edge which, at the same time, is an edge of a trench provided within the depression and countersunk with respect to the wetting surface, carrying out the tempering process so that the free-flowing glass material of the glass flat substrate is brought into contact with the wetting surface so that a wetting front forms along the another edge, and ending the tempering process after the formation of a surface of the glass material, which extends between the wetting front and the circumferential edge without contact with the another flat substrate and that encloses a cavity within a sub-region of the depression; and
wherein the optical surface corresponds to the surface of the glass material that extends between the wetting front and the circumferential edge without contact with the other flat substrate or corresponds to a replication thereof.

35. The optical component according to claim 34, wherein:
the structured flat substrate comprising glass material comprises a structured surface and a planar surface opposite the structured surface, coincides with a plane of the flat substrate and a light source is arranged on the planar surface and the planar surface couples light into the structured flat substrate comprising the glass material so that the light on the optical surface is deflectable.

\* \* \* \* \*